United States Patent [19]

Sato

[11] Patent Number: 4,531,817
[45] Date of Patent: Jul. 30, 1985

[54] FOCUS ADJUSTING DEVICE IN BINOCULAR

[75] Inventor: Akira Sato, Tokyo, Japan

[73] Assignee: Nippon Kogaku K.K., Tokyo, Japan

[21] Appl. No.: 539,290

[22] Filed: Oct. 5, 1983

[30] Foreign Application Priority Data

Oct. 12, 1982 [JP] Japan .............................. 57-154255[U]

[51] Int. Cl.³ ................................................ G02B 7/06
[52] U.S. Cl. ..................................... 350/556; 350/552
[58] Field of Search ................ 350/255, 552, 554–556, 350/560, 563–565

[56] References Cited

U.S. PATENT DOCUMENTS

| | | | |
|---|---|---|---|
| 3,712,704 | 1/1973 | Sato | 350/554 |
| 4,066,329 | 1/1978 | Gerrit | 350/552 |
| 4,470,671 | 9/1984 | Ishida | 350/552 |

*Primary Examiner*—William H. Punter
*Attorney, Agent, or Firm*—Fitzpartick, Cella, Harper & Scinto

[57] ABSTRACT

A binocular is provided with a double-cam mechanism between an operation member and an eyepiece portion. The rotation of the operation member is converted by the double-cam mechanism into an axial movement of the eyepiece portion. With this structure, quick and smooth focus adjusting can be carried out.

6 Claims, 4 Drawing Figures

FOCUS ADJUSTING DEVICE IN BINOCULAR

BACKGROUND OF THE INVENTION

1. Field of the Invention

This invention relates to a focus adjusting device in a binocular.

2. Description of the Prior Art

A conventional focus adjusting device in a binocular is generally provided with a rotating knob at the center portion of the binocular and the rotating operation of the rotating knob moves an eyepiece portion for focus adjusting operation.

In recent years a focus adjusting device for example, as shown in U.S. Pat. No. 4,066,329, has been proposed for the purpose of being capable of effecting momentary focus adjusting for responding to a quick aiming motion, the focus adjusting device being designed in such a manner that a winglike portion for operation is provided instead of the rotating knob; a pin which is bounded to move in the direction of the movement of an ocular is snugly fitted into the cam groove of the winglike portion; and the swing motion of the winglike portion causes the ocular integral with the pin to be moved. However, in the proposed focus adjusting device, an inclination of the cam groove is considerably steep and therefore, when an observer desires to observe by use of a binocular and his eyes press on and are in contact with the eyepiece portion thereof, the eyepiece portion often moves and the in-focus position shifts. To avoid such movement of the eyepiece portion, a friction member such as a spring washer is required. However, use of the friction member unhappily prevents smooth rotation of the winglike portion.

SUMMARY OF THE INVENTION

It is an object of the present invention to overcome the above-noted disadvantages and to provide a focus adjusting device in a binocular capable of quick and smooth focus adjusting operation.

The device according to the present invention is designed in such a manner that a double-cam mechanism is provided between an operation member and an eyepiece portion and the rotation of the operation member is converted by the double-cam mechanism into an axial movement of the eyepiece portion.

In the case of an ordinary binocular whose stroke for focus adjusting operation is relatively small, the use of the double-cam mechanism causes an angle formed between each of two slant cam grooves and the axis direction to be made small. Therefore, a substantial reaction force of the eyepiece portion can be set against an external force applied in the axial direction, so that no conventional friction member is needed, that is, smooth operation for focus adjusting can be carried out.

The invention will become fully apparent from the following detailed description of an embodiment thereof taken in conjunction with the accompanying drawings.

DESCRIPTION OF PREFERRED EMBODIMENT

Figure 1:
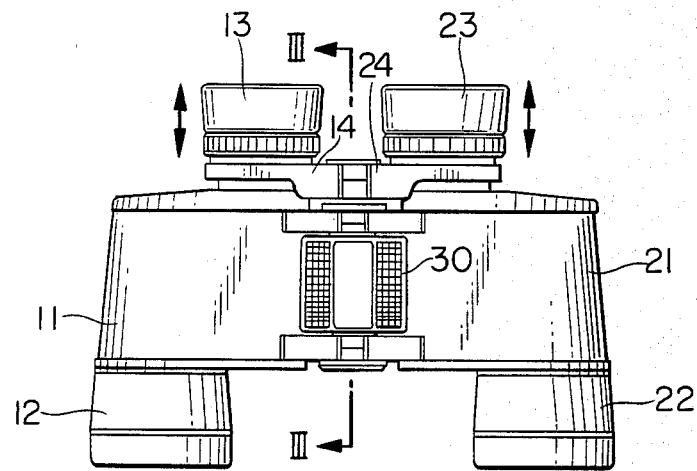
FIG. 1 is a plan view of a binocular according to one embodiment of the present invention.

In FIG. 1, a right-side body portion 11 and a left-side body portion 21 of a binocular each is provided with an objective barrel 12, 22, an ocular portion 13, 23 movable in the arrow-marked direction and a prism (not shown) at the inside thereof.

The ocular portion 13, 23 which has an eyepiece therein is moved through a connecting arm 14, 24 by the vertical movements of a winglike portion 30. As a result of it, the eyepiece moves in the direction of the optical axis to be ready for focus adjusting operation.

Figure 2:
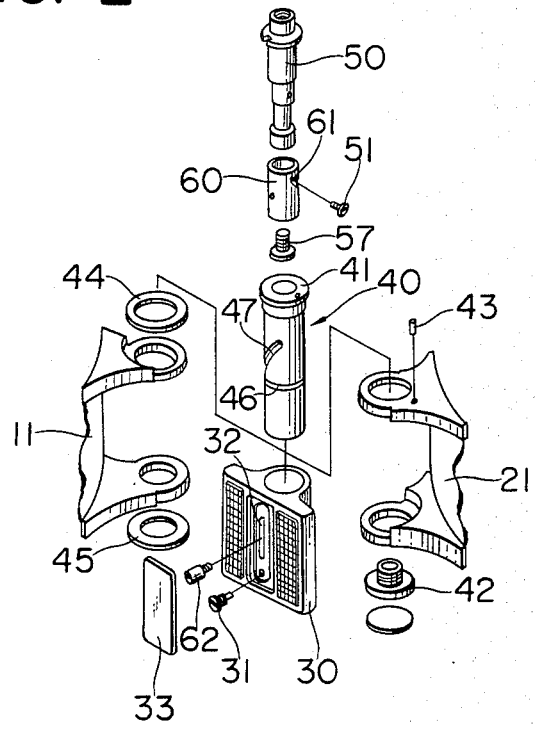
FIG. 2 is an exploded perspective view of a focus adjusting device in the binocular shown in FIG. 1.
Figure 3:
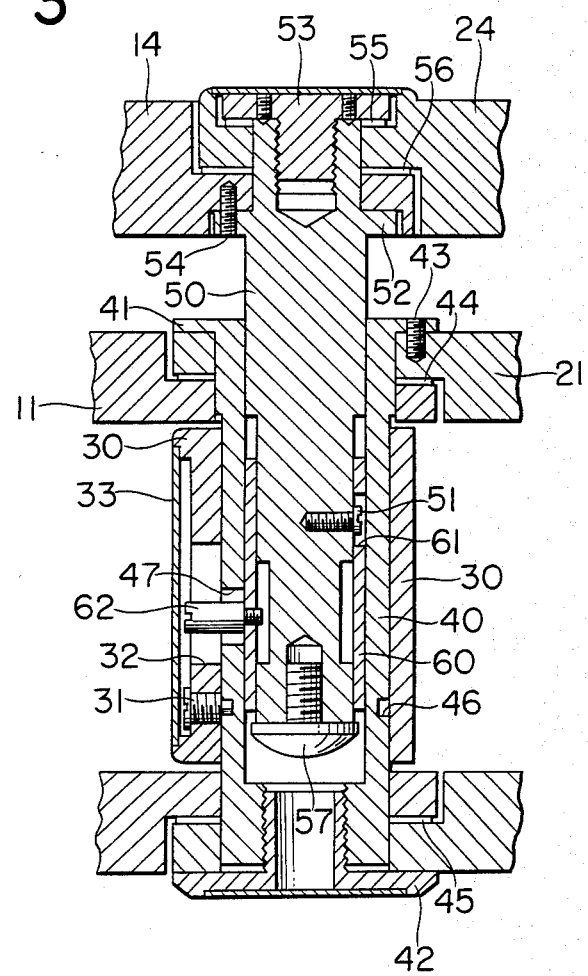
FIG. 3 is a cross-sectional view taken along the lines III—III of FIG. 1.

As shown in FIGS. 2 and 3, the body portions 11, 21 and the winglike portion 30 each are snugly fitted rotatably about the peripheral surface of a hollow cylinder 40. The body portions 11, 21 are held between the collar 41 of the cylinder 40 and a clamp screw 42 so as not to move in the axial direction thereof.

The left-side body portion 21 is integral with the cylinder 40 by a screw 43. Between the right-side body portion 11 and the left-side body portion 21 washers 44, 45 are disposed. On the external peripheral surface of the cylinder 40 a circumferential groove 46 is formed. Into the circumferential groove 46 a pin 31 fixed to the winglike portion 30 is snugly fitted so that the winglike portion 30 is limited to freely rotate and not to move in the axial direction thereof. The positions of the circumferential groove 46 and of the pin 31 are determined in such a manner that the winglike portion 30 can not be in contact with the body portions 11, 21.

A central rod 50 passes through the inside of the cylinder 40. A central cylinder 60 is snugly fitted in between the cylinder 40 and the central rod 50. A slant cam groove 61 is formed on the central cylinder 60.

A pin 51 which is fixed to the central rod 50 is snugly fitted into the cam groove 61.

A slant cam groove 47 is formed on the cylinder 40 in the direction intersecting the cam groove 61. A linear cam groove 32 is formed on the winglike portion 30, the groove 32 extending in the axial direction thereof.

A pin 62 which is fixed to the central cylinder 60 is snugly fitted into the cam groove 47 and the linear cam groove 32.

Between a collar 52 near one end of the central rod 50 and a clamp screw 53, connecting arms 14, 24 are held. The connecting arm 14 is integral with the central rod 50 by a machine screw 54. Between the connecting arms 14, 24 a washer 56 is arranged. Between the screw 53 and the connecting arm 24a washer 55 is disposed. A machine screw 57 which limits the moving range of the central rod 50 is screwed into the other end of the central rod 50. The cam groove 32 of the winglike portion 30 is covered with a plate 33 for preventing entry of dust.

With the structure as mentioned above, when the winglike portion 30 is rotated, the pin 62 is rotated with the winglike portion 30 and moves in the cam groove 32 in the axial direction thereof. This is because the cylinder 40 is integral with the left-side body portion 21 by the machine screw 43, so that the pin 62 moves along the cam groove 47 of the cylinder 40. The movement of the pin 62 is transmitted to the central cylinder 60, that is, the central cylinder 60 moves axially while rotating. Since the pin 51 which is integral with the central rod 50 is snugly fitted into the cam groove 61, the central rod 50 moves axially by an amount resulting from a sum of an axial movement of the central cylinder 60 and an axial movement where the pin 51 moves axially by the rotation of the central cylinder 60. It is noted that the direction of the cam groove 61 intersects the direction of the cam groove 47 so that the movement of the cylinder 60 and the movement of the pin 51 is carried out in the same direction.

In conclusion, the ocular portions 13, 23 move by the rotation of the winglike portion 30 by an amount of sum of axial movement of the pin 62 and axial movement of the pin 51.

Figure 4:
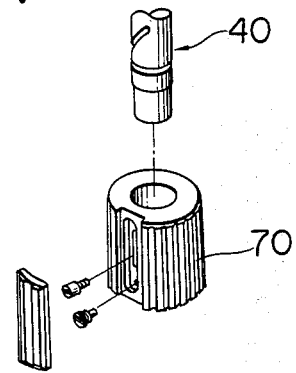
FIG. 4 is a perspective view of an operation member according to another embodiment of the present invention.

Even where the winglike portion 30 is made in the form of a rotating operation knob 70 as shown in FIG. 4, the same result can be obtained.

I claim:
1. A binocular comprising:
   (a) a pair of telescopes, each of the telescopes comprising a body portion and optical member which is movable relative to the body portion in the direction of the optical axis for focus adjusting operation;
   (b) means for connecting said telescopes, the connecting means being provided between the body portions and comprising a first tubular member fixed to at least one of said body portions;
   (c) a rod member provided coaxially with said first tubular member and movable integral with said optical members;
   (d) a second tubular member provided concentrically with said first tubular member and said rod member, said second tubular member being rotatable and movable axially;
   (e) first cam means for connecting said first and second tubular members, the first cam means moving the second tubular member itself in the axial direction thereof in response to the rotation of the second tubular member;
   (f) second cam means for connecting said rod member and said second tubular member, the second cam means moving the rod member in the axial direction thereof in response to the rotation of and axial movement of said second tubular member; and
   (g) means for operating said second tubular member, the operating means comprising an operation member concentric with said first tubular member and integrally connected to said second tubular member in the rotating direction thereof, the operation member being provided with an operation portion to be touched by an operator.

2. The binobular according to claim 1, wherein said first cam means includes a first cam groove which extends in the direction inclined with respect to the axial direction and said second cam means includes a second cam groove which extends in the direction intersecting the direction of the first cam groove.

3. The binocular according to claim 2, wherein said second cam groove is inclined in the direction opposed to the direction of the inclination of said first cam groove with respect to the axial direction thereof.

4. The binocular according to claim 1, wherein said second tubular member has an internal periphery which is in contact with an external periphery of said rod member and an external periphery which is in contact with an internal periphery of said first tubular member, said first cam means includes a first cam groove formed around said first tubular member and a first cam pin provided on said second tubular member, and said second cam means includes a second cam groove formed around said second tubular member and a second cam pin provided on said rod member.

5. The binocular according to claim 4, wherein said operation member is rotatably provided on the external periphery of said first tubular member, and said first cam pin is provided with an extending portion reaching the outside of said first tubular member through the inside of said first cam groove, the extending portion being connected to said operation member.

6. The binocular according to claim 5, wherein said operation member is prevented from being axially moved relative to said first tubular member and is provided with an axially extended groove which is connected to said extending portion of said first cam pin.

* * * * *